(No Model.) 2 Sheets—Sheet 1.
R. W. HUSS.
PNEUMATIC TIRE.
No. 500,658. Patented July 4, 1893.
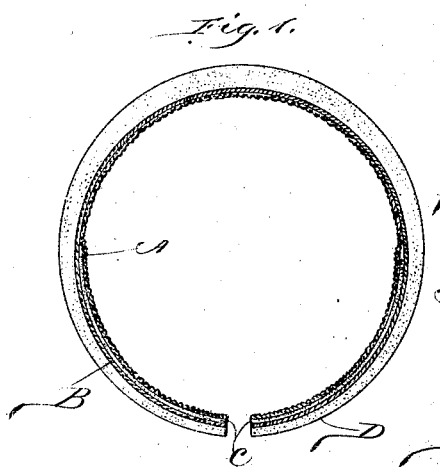
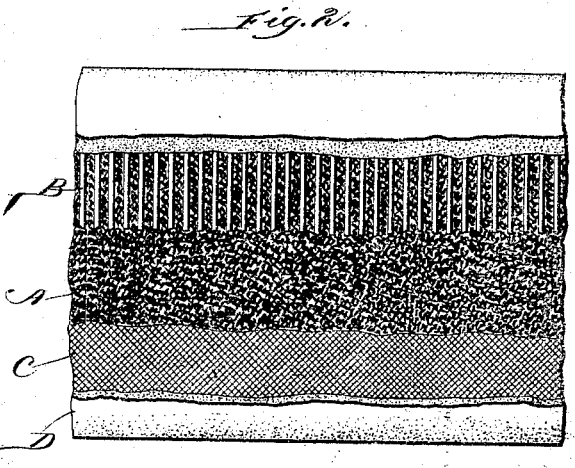
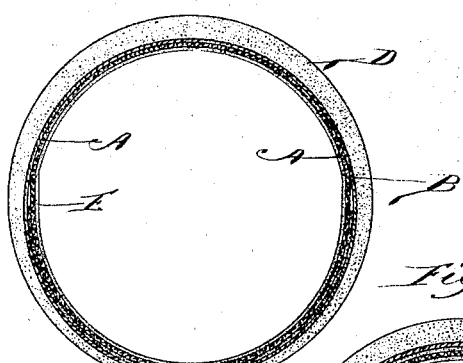
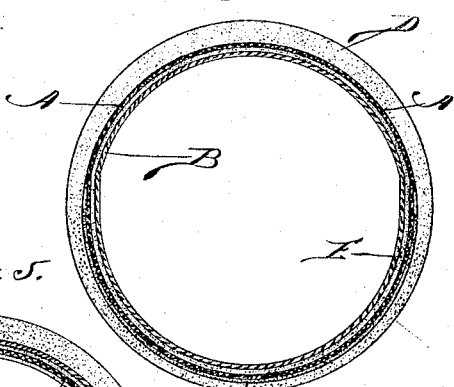
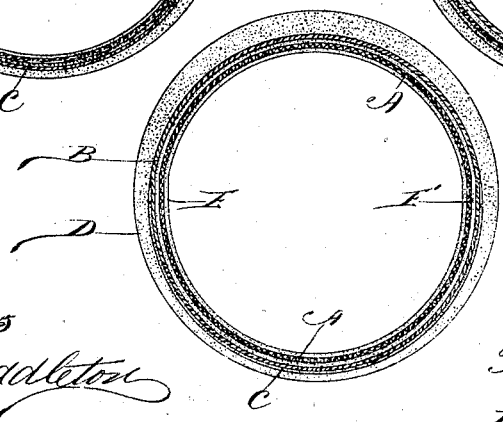
Witnesses
W. D. Middleton
Rola Wagner
Inventor
Rudolph W. Huss
By Chas. G. Page
Atty

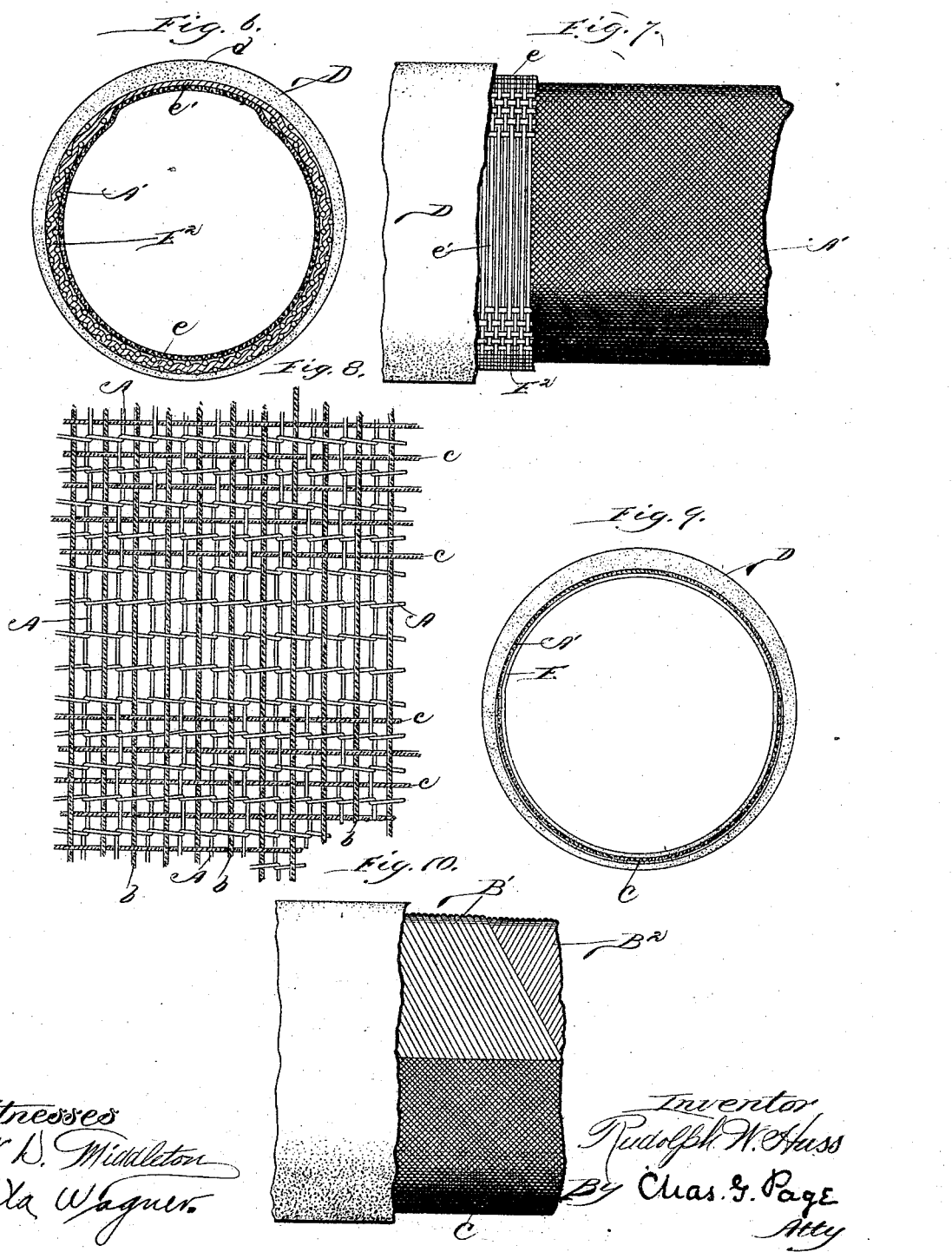

UNITED STATES PATENT OFFICE.

RUDOLPH W. HUSS, OF CHICAGO, ILLINOIS, ASSIGNOR TO HENRY A. LOZIER, OF CLEVELAND, OHIO.

PNEUMATIC TIRE.

SPECIFICATION forming part of Letters Patent No. 500,658, dated July 4, 1893.

Application filed April 10, 1893. Serial No. 469,726. (No model.)

*To all whom it may concern:*

Be it known that I, RUDOLPH W. HUSS, a citizen of the United States, residing at Chicago, in the county of Cook and State of Illinois, have invented a certain new and useful Improvement in Hollow or Pneumatic Tires, of which the following is a specification.

My invention consists in an improvement on the "thread tires" heretofore invented by me and forming the subject matter of several applications which I have made and filed in the United States Patent Office and which are now pending therein. The fundamental principle of the thread tire embodied in my said applications consists in providing the tread portion of a hollow or pneumatic tire with cross threads which are separable from one another to an extent to permit the tire tread to have an elastic longitudinal yield so as to avoid unduly prolonged indentations while running over obstructions along the road, and thereby avoid vibration and also generally increase the efficiency and serviceability of the tire. These cross threads while permitting the tread to have an elastic longitudinal yield, prevent transverse stretch on the part of the tubular tire structure. While, however, it is desirable that the tread should thus have an elastic longitudinal yield, it is not desirable that such longitudinal elastic yield should be present along the sides of the tire, and hence I have in such cases constructed the tire so as to negative or prevent elastic longitudinal stretch along its sides. As one of such ways I have provided it with supplemental strips of material not adapted for stretch, and in others I have provided the tire with a woven fabric from which the warp is omitted along the tire tread.

The invention embodied in this application involves the principles aforesaid, and contemplates further reinforcing the tire in a way to more effectively resist puncture and at the same time permit the tread to have all desired elastic longitudinal yield. To such end therefore I reinforce the tire with a fabric capable of elastic stretch or yield, and at the same time utilize in conjunction with such fabric the principle of a layer or series of cross threads arranged so as to hold the tread against objectionable transverse stretch but permit it to have all desirable elastic longitudinal yield. These cross threads may be incorporated within the elastic fabric, or they can be arranged supplemental thereto. The fabric employed is preferably a knit fabric which will stretch, although for the broader purposes of my invention I can employ a fabric woven on the bias in tubular form so as to be capable of longitudinal yield.

In the accompanying drawings,—Figures 1, 3, 4 and 5 are sections taken transversely through the tire, and respectively illustrate variations in the relative arrangement of the layers of which the same is formed, the construction of Fig. 1 being further shown in Fig. 2 which is a side view of a portion of the tire with parts of the layers broken away. Fig. 6 is a cross section through the tire involving a tubular layer of fabric woven on the bias. Fig. 7 is a view of a portion of the tire with portions of the layers broken away. Fig. 8 shows a piece of the knit fabric formed with cross and longitudinal threads, and understood to be magnified for convenience of illustration. Fig. 9 is a section through the tire further illustrating the use of a tubular layer of fabric coarsely woven on the bias. Fig. 10 shows a portion of the tire with layers of thread wound spirally in reverse directions.

In each of the first five figures, the tire is constructed with a layer A of knit fabric; a layer B of transversely arranged threads or thread portions; a reinforcing strip or layer C of canvas or like fabric, and an outer layer or cover D of rubber. In Figs. 1 and 2, the tubular structure formed by these layers is particularly adapted to serve as a sheath for an inflatable air-tube. Said sheath can also be divided in whole or in part along its base or seating portion, and can be adapted for securement upon a wheel rim in any ordinary or desired way. In said Figs. 1 and 2, the knit fabric A forms a lining for the sheath, and is surrounded by a layer B of spirally wound thread. The reinforcing strip or layer C is arranged between the knit fabric and thread layer, and particularly serves to hold the sides or sides and base of the sheath against longitudinal stretch. These layers can be united by rubber cement or by one or more thin layers of rubber, although the thread layer need not be thus united with the knit fabric along the tread of the tire. The thread layer is however preferably united with the outer rubber layer D, which latter can be molded upon the former. The said structure can be formed upon a suitable mandrel, and can be pressed and vulcanized upon the same.

The foregoing description will apply generally to the constructions shown in Figs. 4, 3 and 5, save that in such figures a somewhat different order of arrangement is observed, as follows:

In Fig. 3 a tubular rubber layer E is formed as a lining, whereby the tire can be either formed on a mandrel or formed by the "blown" process. In said figure the knit fabric A is arranged next upon the tubular rubber layer E and the thread layer B is arranged between the outer rubber cover D and the knit fabric, with the reinforcing strip or layer C between the knit fabric and thread layer.

In Fig. 4 the thread layer B is arranged as a lining for the rubber layer E and the knit fabric A is arranged between the cover layer D and the rubber layer E, with the reinforcing strip or layer C between the knit fabric and the cover layer.

In Fig. 5 the tire has first a lining formed by the rubber layer E, next the knit fabric A, next another rubber layer E', next the thread layer B, and next the cover layer D with the reinforcing strip or layer C interposed between the cover layer and thread layer. In forming each of the foregoing constructions, the rubber employed will under suitable pressure and vulcanization readily adhere to the adjacent layer or layers employed, although I may for some purposes introduce the knit fabric as a loose tube.

I can also in place of spirally winding the thread, employ a woven fabric having the warp threads omitted along its portion which will reinforce the tread of the tire, as in my application for Letters Patent of the United States, Serial No. 442,438, filed August 8, 1892. And in such case I can dispense altogether with the reinforcing strips C since the sides of the tire will with such arrangement be reinforced by a fabric incapable of any material stretch. As further illustrative of this, I have shown in Figs. 6 and 7 a reinforcing layer $E^2$ whereof the portion $e$ is composed of warp and woof treads, while its portion $e'$ along the tread $d$ of the tire is composed of woof threads with the warp threads omitted.

In place of knit fabric I can employ fabric woven so as to stretch, and to such end I may use a tubular layer A' of fabric coarsely woven on the bias as best shown in Fig. 7, and in conjunction therewith provide if desired a layer of rubber united with such fabric, it being understood that while ordinary canvas thus woven will not answer, fabric can be thus woven sufficiently coarse to admit of stretch, particularly if cotton or woolen threads are used. The knit fabric can slso be made with cross threads $b$ and longitudinal threads $c$ incorporated within it as illustrated in Fig. 8 which shows a portion of the knit fabric A.

In Fig. 9 the tubular layer A' of fabric understood to be woven on the bias, is united with an inner layer E of rubber, the arrangement of the remaining layers being seen without further description. The general effect of the fabric wound on the bias may also be attained by two layers B', $B^2$, Fig. 10, of spirally wound thread whereof one is wound the reverse of the other, it being obvious that such layers can be incorporated with rubber and that the threads of one layer will cross the threads of the other layer, which arrangement while multiplying the spirally wound layer of my previous applications, thickens the reinforcement. In such case, however, the sides of the tire are held against longitudinal stretch, which can be attained by the reinforcing layer C hereinbefore described or by any suitable arrangement of longitudinal threads.

The thread layer B herein referred to, can be formed by winding or weaving or in any suitable way, and the threads or thread portions along the tread can cross the same either at right angles thereto or oblique as a result of winding, both of which arrangements are included in the term "cross" threads or thread-portions.

What I claim as my invention is—

1. A hollow or pneumatic tire having its tread reinforced by cross-threads or thread portions and fabric adapted for stretch, substantially as described.

2. A hollow or pneumatic tire having its tread reinforced by a plurality of reinforcing layers adapted to permit longitudinal elastic yield on the part of the tread, substantially as set forth.

3. A hollow or pneumatic tire having along its tread a reinforcing layer of cross threads and fabric adapted for stretch, and having its sides reinforced against longitudinal stretch, substantially as described.

4. A hollow or pneumatic tire reinforced by a knit fabric and having its sides reinforced against longitudinal stretch, substantially as set forth.

5. A hollow or pneumatic tire having its tread reinforced by thread layers spirally wound in opposite directions, and having its sides reinforced against longitudinal stretch, substantially as described.

RUDOLPH W. HUSS.

Witnesses:
J. N. WHITTAKER,
WM. SILL.